(No Model.)
J. P. LAVIGNE.
BICYCLE PEDAL.
No. 601,517. Patented Mar. 29, 1898.
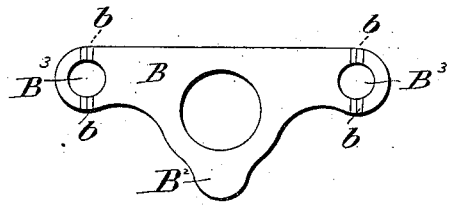
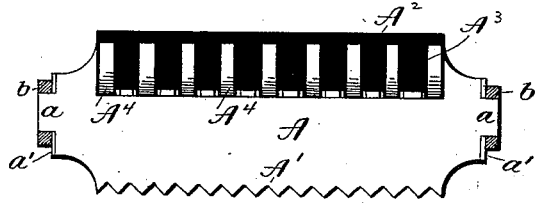
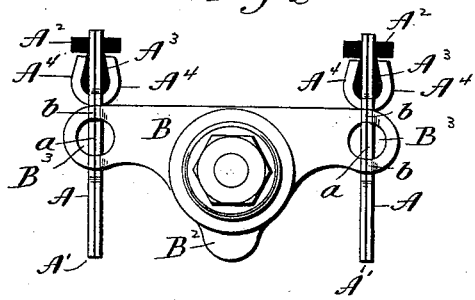
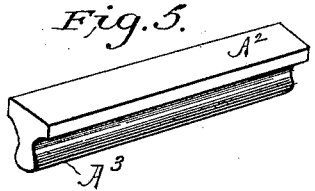
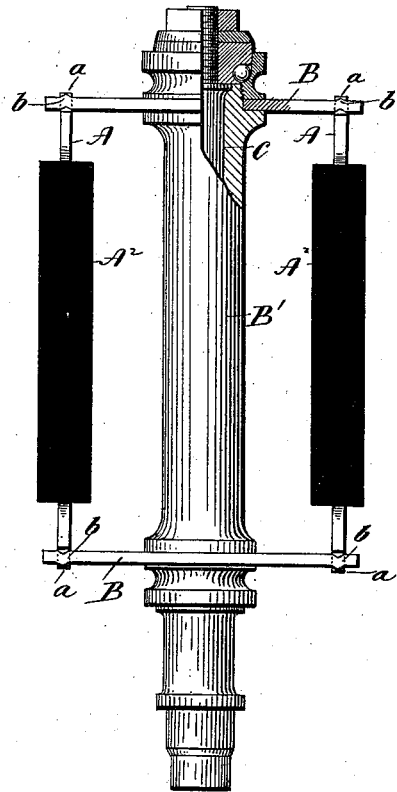
Witnesses,
J. H. Shumway
Lillian D. Kelsey
Joseph P. Lavigne
Inventor
By Atty
Earle Seymour

UNITED STATES PATENT OFFICE.

JOSEPH P. LAVIGNE, OF NEW HAVEN, CONNECTICUT, ASSIGNOR OF ONE-HALF TO WILBUR F. DAY, OF SAME PLACE.

BICYCLE-PEDAL.

SPECIFICATION forming part of Letters Patent No. 601,517, dated March 29, 1898.

Application filed February 10, 1896. Serial No. 578,648. (No model.)

*To all whom it may concern:*

Be it known that I, JOSEPH P. LAVIGNE, of New Haven, in the county of New Haven and State of Connecticut, have invented a new Improvement in Bicycle-Pedals; and I do hereby declare the following, when taken in connection with the accompanying drawings and the letters of reference marked thereon, to be a full, clear, and exact description of the same, and which said drawings constitute part of this specification, and represent, in—

Figure 1, a view, partly in plan and partly in section, of a pedal constructed in accordance with my invention; Fig. 2, an end view thereof; Fig. 3, a detached view, in side elevation, of one of the foothold-plates; Fig. 4, a detached view, in inside elevation, of one of the elastic frame-plates; Fig. 5, a detached view in perspective of one of the rubber bars.

This invention relates to an improvement in pedals for bicycles, the object being to produce a combined rat-trap and rubber-bar pedal adapted to be adjusted so as to perform all the functions of pedals of either of the two types mentioned, according to the disposition of the rider or the dictation of circumstances, so that one pedal combines the advantages and discharges the functions of two distinct types of pedals, with obvious gain in economy and convenience.

With these ends in view my invention consists in the combination, with a balanced pedal-frame, of foothold-plates having rat-trap and rubber-bar holds mounted in the frame and reversible edge for edge therein.

My invention further consists in certain details of construction and combinations of parts, as will be hereinafter described, and pointed out in the claims.

As herein shown, my improved pedal comprises two corresponding flat plates A A, which I shall hereinafter term "foothold-plates," because they have the function suggested by that term. Each of these plates has one of its edges constructed with teeth A', which from their supposed resemblance to the teeth of rat-traps give those edges of the plates the characteristic appearance and function of the footholds of rat-trap pedals. The other edges of the plates are furnished with rubber bars $A^2 A^2$, having ribs $A^3 A^3$ formed upon their inner edges and inserted into skeleton pockets formed by cutting the edges of the plates transversely to form a series of retaining-fingers $A^4$, which are alternately set in opposite directions, as clearly shown in Fig. 2. I do not, however, limit myself to serrating the plates, as shown, nor to providing them in the manner set forth with rubber bars, as in those respects the plates may be modified without departing from my invention. Each of the plates is constructed at each end with a flat oblong trunnion $a$ and with two doubly beveled or pointed retaining locking-teeth $a'$ $a'$, located in line with the trunnions and above and below the same.

The frame of the pedal, as herein shown, comprises two elastic frame-plates B B and a long hub or sleeve B', through which the spindle or pedal-pin C passes and to which the frame is connected in any suitable manner. Each of the frame-plates is constructed with a straight upper edge and with a depending balancing extension $B^2$, whereby the frame is balanced in one position, to which it always returns under the action of gravity, which tends to keep the straight upper edges of the frame-plates in a horizontal position. Each frame-plate is constructed, as shown in Fig. 4, with two round bearing-holes $B^3 B^3$, respectively located in its opposite ends and adapted to receive the trunnions $a$ of the plates. These trunnions do not fill the said bearing-holes, but fit into them, as shown in Fig. 2. The inner faces of the ends of the frame-plates are constructed with two pairs of short doubly-beveled locking or retaining grooves $b\ b\ b\ b$, of which the grooves of each pair are located above and below the respective bearing-holes $B^3$. These grooves, as shown, are formed by striking the frame-plates outward from their inner faces, as shown in Fig. 1. When the foothold-plates are assembled in the frame-plates, the trunnions $a$ of the foothold-plates enter the bearing-holes $B^3$ of the frame-plates, and the retaining-teeth $a'$ of the foothold-plates enter the retaining-grooves $b$ of the frame-plates, which though slightly elastic are sufficiently rigid to prevent the foothold-plates from rotating under any ordinary usage of the pedal. The said retaining-teeth $a'$ of the foothold-plates and the said retaining-grooves $b$ of the frame-plates constitute in effect interlocking means between the frame-plates and foothold-plates for locking the latter in their respective positions.

When it is desired to convert the pedal for use as a rat-trap pedal, the foothold-plates are seized by the fingers and rotated through a half-circle between the frame-plates, so as to bring their serrated edges uppermost. When they reach this position, their retaining-teeth will snap into the retaining-grooves, after which the frame-plates will hold them in their set or adjusted positions. As the pedal-frame is balanced for one position the rat-trap edges of the foothold-plates will therefore be presented to the foot so long as the plates remain adjusted, as described; but when it is desired to use the pedal as a rubber-bar pedal the foothold-plates are seized and turned so as to spring their retaining-teeth out of the retaining-grooves of the frame-plate and reversed in position so as to bring their rubber-bar edges uppermost. Then after being moved through one hundred and eighty degrees the retaining-teeth again snap into the retaining-grooves, whereby the plates are virtually locked in those positions.

It will be understood that when the foothold-plates are being reversed edge for edge their retaining-teeth $a'$ ride out, so to speak, of the retaining-grooves $b$ of the frame-plates and ride over the inner faces of the same until brought into registration again with the said retaining-grooves thereof, into which they are then locked by the springing back of the frame-plates into their normal positions.

It will thus be seen that by rotating the foothold-plates the pedal may be converted for use either as a rat-trap pedal or as a rubber-bar pedal. It is also clear that it will perfectly discharge the functions of pedals of either of those types.

It is apparent that in carrying out my invention some changes from the construction herein shown and described may be made. Thus the foothold-plates may be modified in form as well as the frame and the frame-plates, it being only essential that the foothold-plates shall be adapted to be reversed edge for edge in the frame-plates and held in their reversed positions. I am aware, however, that balanced pedals, broadly speaking, are old, and also that it is old to provide a pedal with plates having their respective edges adapted to discharge the functions of rat-trap and rubber-bar pedals.

Having fully described my invention, what I claim as new, and desire to secure by Letters Patent, is—

1. In a convertible pedal, the combination with a balanced pedal-frame comprising two yielding frame-plates, of two vertical foothold-plates, having their respective edges adapted to discharge the functions of rat-trap and rubber-bar pedals, and mounted in the said frame-plates which, on account of their yielding character, spring to permit the foothold-plates to be reversed edge for edge, and interlocking means between the frame-plates and foothold-plates, adapted to ride into and out of engagement when the foothold-plates are turned and the frame-plates are caused to elastically yield.

2. In a bicycle-pedal, the combination with a balanced pedal-frame comprising two yielding frame-plates having bearing-holes and locking-grooves, of two foothold-plates having their respective edges adapted to discharge the functions of rat-trap and rubber-bar pedals, and provided at their ends with trunnions and with locking-teeth respectively entering the bearing-holes and locking-grooves of the said frame-plates whereby the foothold-plates may be manually reversed edge for edge between the yielding frame-plates without their removal from the pedal.

In testimony whereof I have signed this specification in the presence of two subscribing witnesses.

JOSEPH P. LAVIGNE.

Witnesses:
FRED. C. EARLE,
LILLIAN D. KELSEY.